United States Patent [19]

Csehi et al.

[11] Patent Number: 5,088,921
[45] Date of Patent: Feb. 18, 1992

[54] HEAT TREATMENT FURNACE

[75] Inventors: Dennis M. Csehi, Oregon; James A. Meeker, Toledo, both of Ohio

[73] Assignee: Libbey-Owens-Ford Co., Toledo, Ohio

[21] Appl. No.: 613,312

[22] Filed: Nov. 14, 1990

[51] Int. Cl.⁵ .................. F27D 23/00; F27B 9/26
[52] U.S. Cl. .......................... 432/121; 432/3; 432/76; 432/123; 432/137
[58] Field of Search ............. 432/121, 123, 135–137, 432/141, 225, 226, 3, 76

[56] References Cited

U.S. PATENT DOCUMENTS

| 1,677,002 | 7/1928 | Olson et al. | 432/76 |
| 2,856,172 | 10/1958 | Kautz | 432/76 |
| 2,867,428 | 1/1959 | Montagna | 432/76 |
| 2,869,856 | 1/1959 | Greene | 432/76 |

Primary Examiner—Henry C. Yuen
Attorney, Agent, or Firm—Marshall & Melhorn

[57] ABSTRACT

An elongated, horizontal tunnel-type furnace for heat treating workpieces carried in succession therethrough. The furnace is of modular construction and comprises a series of contiguous individual modular sections that define a tunnel-type enclosure. Each modular section comprises a stationary lower enclosure section and an assembled vertically retractable upper enclosure section. The upper enclosure sections are supported along opposite sides by a plurality of spaced, free-standing lifting devices. A screw-jack is associated with each lifting device for raising and lowering the upper enclosure sections relative to the lower enclosure sections. The upper enclosure sections may be raised and lowered individually or joined together and moved as a unit.

15 Claims, 3 Drawing Sheets

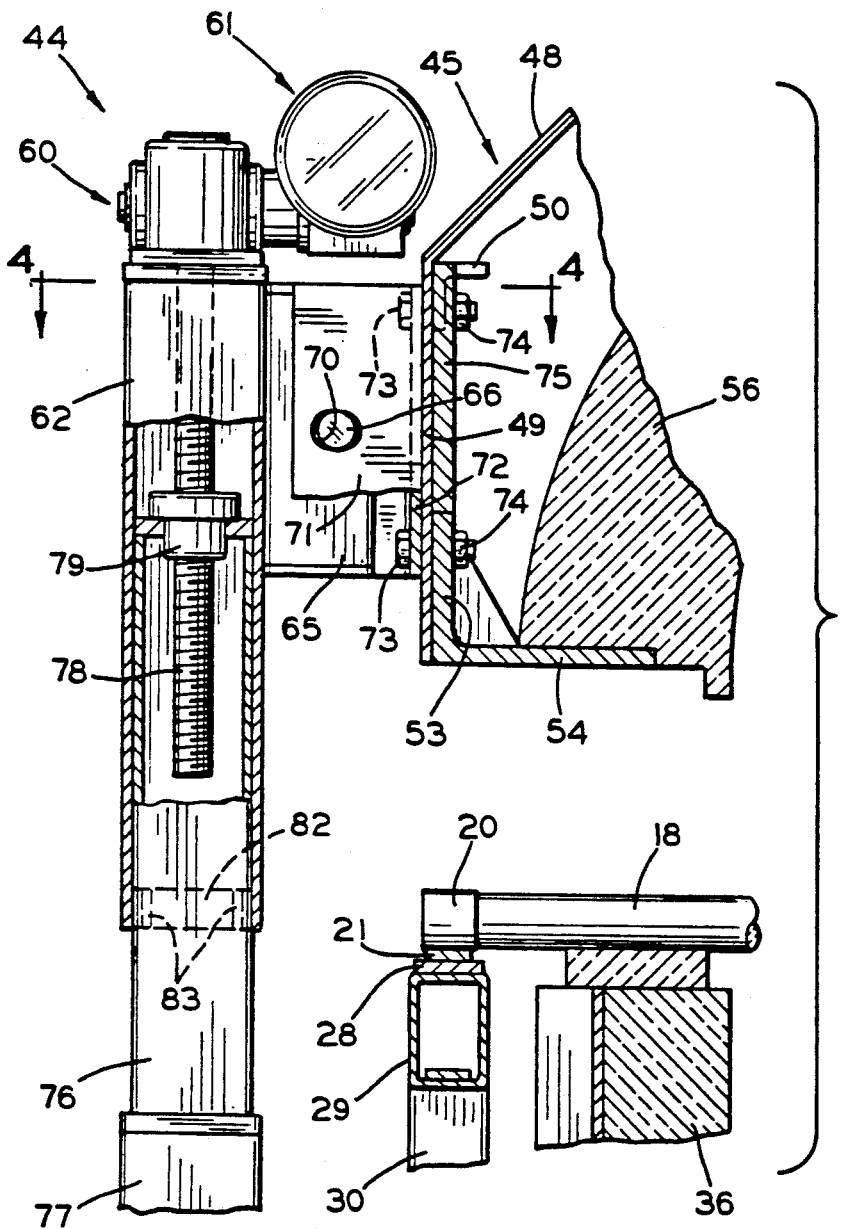
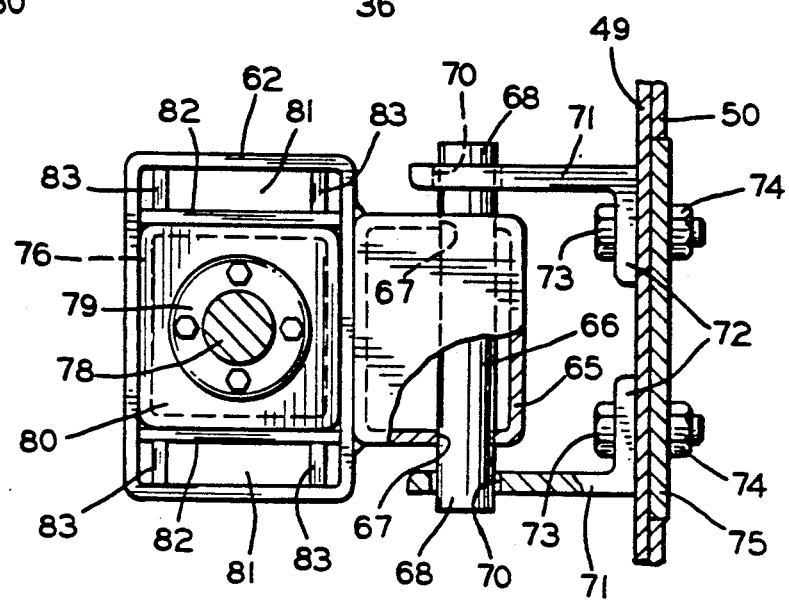
FIG. 3
FIG. 4

HEAT TREATMENT FURNACE

BACKGROUND OF THE INVENTION

1. Field of the Invention

The present invention relates to heating furnaces of the elongated tunnel-type, and more particularly to such furnaces having a fixed lower section and a vertically retractable upper section.

2. Description of the Prior Art

Horizontal elongated tunnel-type furnaces are conventionally utilized for the heat treatment of various materials, such as glass, ceramics and metal, for example. The materials, or workpieces, oftentimes are in the form of plates or continuous strips and, generally, are carried through the furnace on a roller or belt-type conveyor. The furnaces are typically utilized to heat the workpieces in a controlled manner for further processing at a subsequent work station or stations.

Early heat treating furnaces generally comprised an elongated refractory chamber of rectangular cross section. The walls and roof were stationary members and included suitable heating means, such as gas and electrical resistance heaters, to heat the interior of the furnace.

The glass industry, particularly the flat glass industry, has realized considerable success with tunnel-type furnaces and has come to rely substantially on their use for the heat treatment of automotive and architectural glass. Glass sheets employed in the automotive industry, for example, are typically heated to their softening point while transiting a tunnel-type furnace, and then bent by suitable tooling to a prescribed configuration dictated by the design of the automobile in which they are to be installed After bending, the sheets which are to be employed as side lites and backlites are typically subjected to rapid chilling so as to develop a desired degree of temper. The sheets which are to be employed as windshields are gradually cooled so as to be annealed, and then laminated to another sheet or sheets in various combinations by means of a plastic interlayer.

Architectural glass is generally supplied in planar form and may be tempered, annealed and laminated much the same as automotive glass. The glass sheets undergo substantially the same processing treatment, except for the bending process, as described above for automotive glass. Of course, if the sheet is to be bent, bending is carried out prior to tempering, annealing and laminating.

Flat glass furnaces typically employ roll conveyor systems. The earlier conveyor systems generally comprised a series of spaced metallic rolls which extended across the furnace and were supported in journals located outside the side walls. A worm gear affixed to one end of each roll drivingly engaged a worm wheel on a drive shaft running along and mounted for rotation adjacent a side wall of the furnace. Such conveyer systems, while being mechanically sound, were relatively expensive to build and maintain, and did not readily admit to changing of individual rolls should that become necessary.

Rolls having ceramic glass contacting surfaces were found to have significant advantages over metallic rolls in the conveying of the sheets through the furnace. However, it was found that such rolls frequently require refurbishing to maintain their glass-contacting surface in a suitable condition, so that it is occasionally necessary to remove and replace individual rolls or groups of rolls. In order to facilitate changing of the rolls, so-called friction drive systems were devised wherein the rolls rest at each end, outside the furnace enclosure, upon longitudinally extending belts. The ends of the rolls are restrained against longitudinal movement so that as the flights of the belts upon which the rolls rest are advanced, the rolls are driven in rotation. Another roll drive system which provides ready access to rolls for servicing or replacement is disclosed and described in detail in copending application Ser. No. 07/485,643 filed Feb. 27, 1990. Changing of rolls and access to the furnace interior was further improved by the development of furnaces whose upper sections, that is, the portion above the roll line, comprises a vertically retractable assembly. A number of systems have been devised and implemented for raising and lowering the upper sections of such furnaces. While the systems have met with various degrees of success for their intended purpose, none has been found completely satisfactory from the standpoint of complexity, maintenance and overall costs.

SUMMARY OF THE INVENTION

In accordance with the present invention, there is provided a heating furnace comprising a sectional or modular elongated tunnel-type enclosure through which workpieces are carried in succession upon a horizontally extending conveyor. The furnace enclosure includes a stationary lower section and a vertically retractable upper section. The horizontally extending conveyor is positioned at the juncture of the upper and lower furnace sections. An improved lift mechanism is attached to the upper section of the furnace to permit vertical retraction of the upper section and to thereby provide access to the conveyor and the furnace. While the lower and upper sections of the furnace are illustrated and described herein as being of rectangular and elliptical cross-section, respectively, it will be appreciated that the furnace sections may be of other configurations. Likewise, the conveyor system, while being illustrated as a roller-type with a friction drive, may be of other types with suitable drive means for transporting workpieces in a generally horizontal path.

The lift mechanism, of relatively simple construction, is comprised of a series of lifting devices disposed on opposite sides of the furnace at longitudinally spaced apart locations. Each lifting device includes a screw jack and an associated drive unit which is carried at the upper end of a hollow vertical column connected to the side of the upper furnace section. The hollow column is, in turn, telescopically supported for vertical movement atop a stationary second hollow column. The screw jack includes an extensible screw lift rod which is operably connected to the second column by a suitable nut. Thus, as will be readily appreciated, by appropriately operating the screw jack on either side of the furnace enclosure to retract or extend the lift rods, the upper furnace section can be raised and lowered.

Therefore, it is a primary object of the invention to provide a tunnel-type heating furnace having a stationary lower section and a vertically retractable upper section with an improved lift mechanism for raising and lowering the upper section.

Another object of the invention is to provide such a lift mechanism utilizing a minimum number of components.

Yet another object of the invention is to provide such a lift mechanism that is compact and easy to maintain.

Other objects and advantages will become more apparent during the course of the following description when taken in connection with the accompanying drawings.

BRIEF DESCRIPTION OF THE DRAWINGS

In the drawings, wherein like numerals refer to like parts throughout:

FIG. 3 is an enlarged fragmentary side elevational view of one of the jack assemblies of the invention with parts broken away for the sake of clarity; and FIG. 4 is an enlarged, horizontal sectional view taken substantially along line 4—4 of FIG. 3 with parts broken away for the sake of clarity.

DESCRIPTION OF THE PREFERRED EMBODIMENT

The invention is directed to an improved lift mechanism for vertically retracting the upper section of a furnace and is illustrated and will be described in association with a furnace and a roller conveyor system for the heat treatment of flat glass sheets. It is to be understood, however, that the invention is not limited thereto and may be utilized on furnaces for the heat treatment of materials or objects other than glass sheets. Likewise, the particular configuration of the furnace as well as the conveyor system illustrated is not to be considered limitative to the scope of the invention. The novel lift mechanism may be employed with other furnace configurations and conveyor systems as well.

Figure 1:
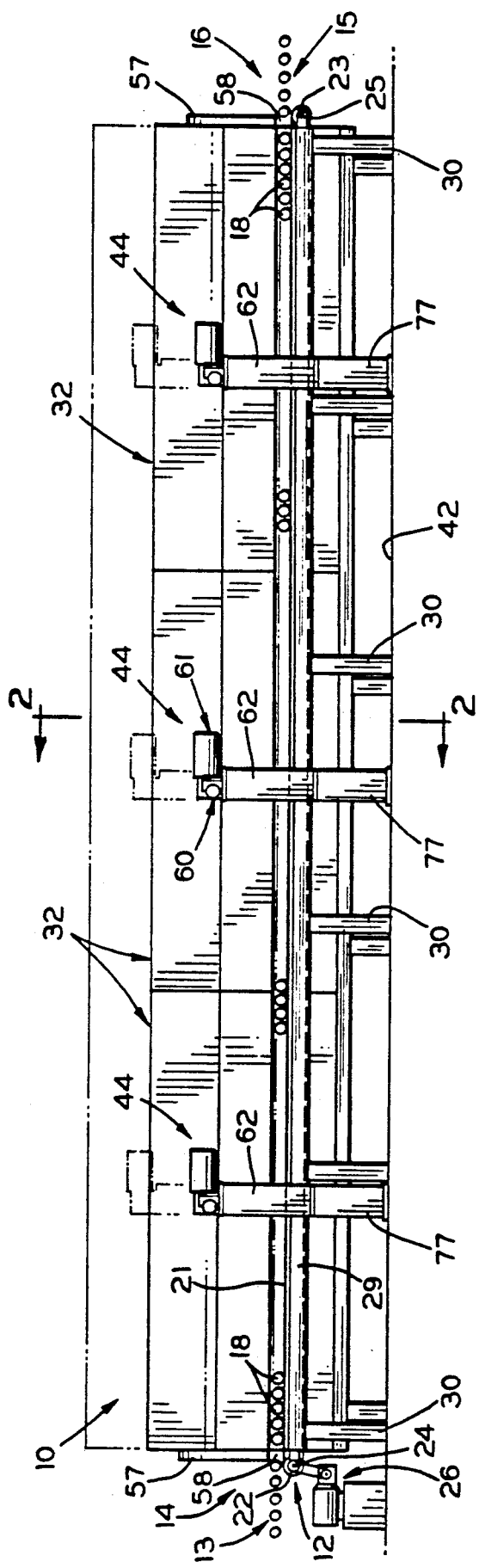
FIG. 1 is a schematic, longitudinal, elevational view of a heat treating furnace incorporating the lift mechanism of the invention.
Figure 2:
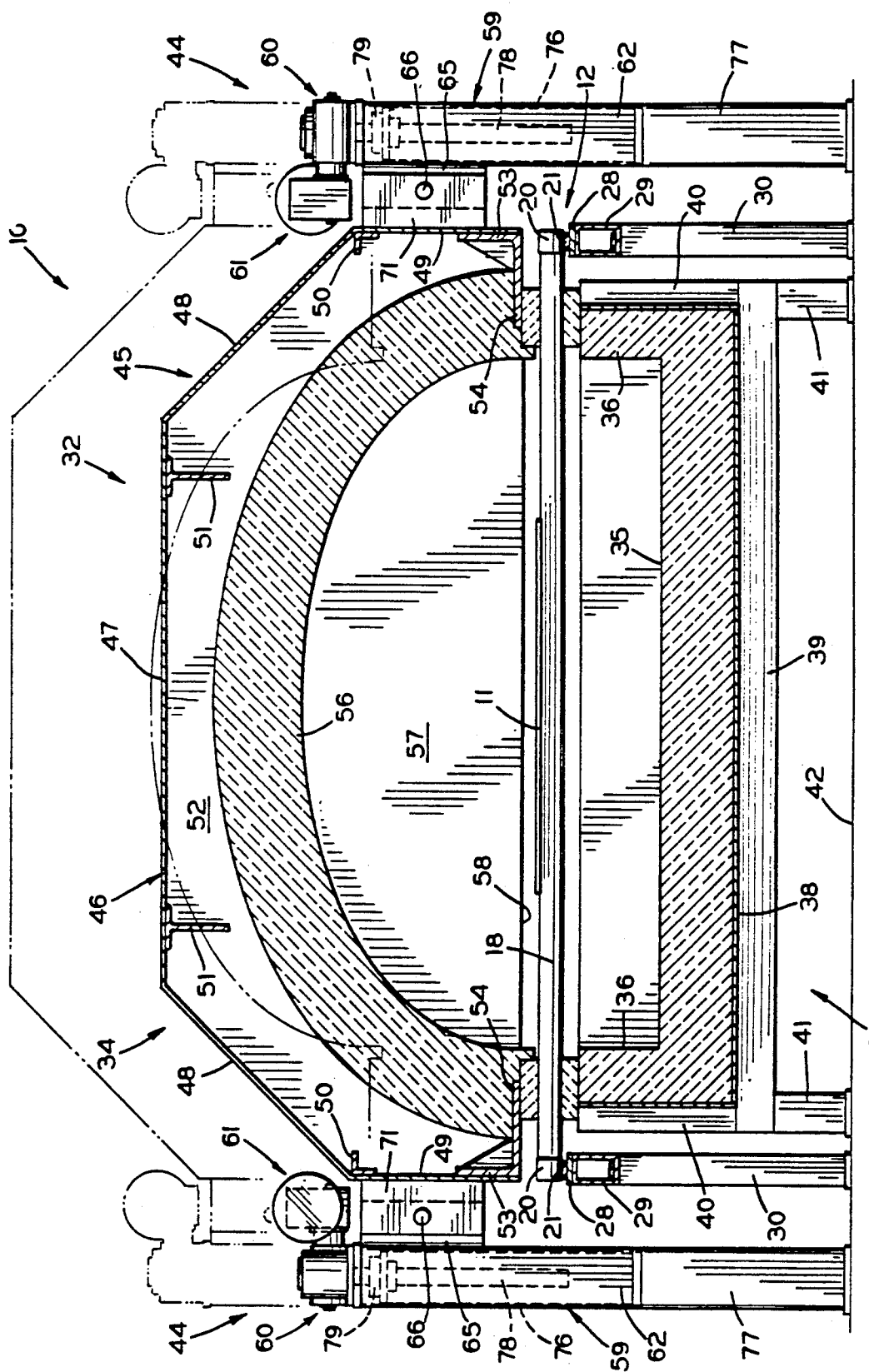
FIG. 2 is an enlarged transverse sectional view, taken substantially along line 2—2 of FIG. 1.

With reference now to the drawings, there is illustrated in FIGS. 1 and 2 a heat treating furnace identified generally at 10, for heating glass sheets 11 in a controlled manner for further processing at subsequent bending and/or cooling stations (not shown). A furnace roller conveyor 12 is provided for transporting the glass sheets in a generally horizontal path through the furnace 10. A roller conveyor 13 at the entrance end 14 of the furnace 10 delivers the glass sheets 11 onto the conveyor section 12. At the exit end 15 of the furnace the sheets 11 are received upon a roller conveyor section 16 which carries them into an adjacent processing station (not shown). The conveyor sections 12, 13 and 15 operate in concert in the conventional manner to transport a series of glass sheets into and through the furnace.

The furnace conveyor 12, although not limited thereto, is shown as a friction drive conveyor which is commonly employed in the flat glass industry. As hereinabove mentioned, other conveyor systems such as that disclosed in copending application Ser. No. 07/485,643 may be employed without departing from the scope of the invention. With reference particularly to FIGS. 1 and 2, the conveyor 12 comprises a plurality of spaced individual rolls 18, longitudinally aligned along a horizontal path to carry the individual glass sheets 11 from the entrance to the exit end of the furnace 10. Such rollers, as previously mentioned, generally have a ceramic work-contacting surface and may be fabricated of fused silica or quartz. The rolls 18, typically, are provided with metallic end caps 20 which are drivingly supported on the upper flight of a pair of continuous drive belts 21 disposed on opposite sides of the furnace 10. The drive belts 21 are entrained about associated sheaves 22 and 23 carried on shafts 24 and 25, respectively, adjacent the entrance and exit ends of the furnace. The belts 21 are driven by a drive unit 26 suitably connected to the shaft 24 at the entrance end of the furnace. The upper flights of the belts 21 slide along associated support plates 28 mounted on longitudinal beams 29 affixed to posts 30. The lower runs of the belts 21 are conveniently carried inside the beams 29. The rolls 18 are supported at their ends on the upper flights of the belts 21 and restrained against longitudinal movement by means (not shown) well known in the industry. Thus, as the flights of the belts 21 upon which the rolls 18 rest are advanced, the rolls are driven in rotation.

The heating furnace 10 is typically formed of a series of individual modular sections 32 (FIG. 1) arranged in end-to-end relationship for forming the tunnel-type enclosure. The number of modules employed is dependent on a number of factors such as the length of the individual modules and various operating requirements for the furnace. Three such modular sections are illustrated in the drawing.

As best illustrated in FIG. 2, each modular section 32 comprises a lower enclosure section 33 and an independently supported upper enclosure section 34 The rolls 18 of the conveyor 12 are positioned between the lower and upper enclosure sections of the furnace 10.

The lower enclosure section 33 comprises a bottom wall 35, opposite side walls 36 and a metallic casing 38 carried within a structural framework including cross members 39 and vertical side braces 40. The walls are typically formed of a refractory material capable of withstanding the high temperatures associated with industrial furnaces. The cross members are supported upon pedestals 41 resting on a supporting surface 42, such as a building floor.

As hereinbefore indicated, the upper enclosure sections 34 of the furnace are mounted for movement between a lowered, operating position and a raised, access position. The raised position is shown in phantom lines in FIGS. 1 and 2. To that end, the upper enclosure sections 34 are supported at the opposite sides by a plurality of free standing lifting devices 44 supported upon the floor 42. Each module of the upper enclosure section comprises an outer casement 45 serving as a framework for the section. The casement comprises an external shell 46 formed of a top cover plate 47, angled corner plates 48 and oppositely disposed vertical side plates 49. Longitudinally extending angle members 50 and braces 51 affixed to the inside of the side plates 49 and the top cover plate 47, respectively, and stiffener rib sections 52 affixed to the inside of the external shell 46 at longitudinally spaced apart intervals provide structural support for the outer casement 45.

Angle shaped support members 53 having inwardly directed horizontal legs 54 are affixed along the lower extremities of the casement 45 A refractory cap or arch 56 positioned beneath the shell 46 is supported at its lower edges upon the horizontal legs 54 of the support members 53. A wall 57 at each end of the furnace encloses the upper enclosure section 34 above the conveyor. A suitable gap 58 is provided between the wall and the conveyor for permitting passage of the sheets 11 into and out of the furnace on the conveyor.

The lower and upper enclosure sections 33 and 34, respectively, are provided with suitable heating means (not shown) for heating the furnace chamber in a controlled manner for the proper processing of the glass sheets. Gas and electrical resistance heaters are commonly utilized as the heating means for such furnaces.

The upper enclosure sections 34, as previously mentioned, are mounted for vertical movement by the lifting devices 44. The enclosure sections 34 can be suitably joined at the ends to move as a unit or they may be left unattached so as to be movable independently of one another. Whether the upper enclosure sections are joined together or operate as individual modules is of course, a determining factor in deciding the number and placement of lifting devices. Generally, a greater number of lifting devices is required for a furnace having a plurality of upper enclosure sections that are raised individually than for one incorporating enclosure sections that are interconnected so as to be raised as a unit. It can be appreciated that in the former instance, at least two such devices would be required on each side, one adjacent each end. In the latter, the lifting devices can be spaced farther apart to accommodate the overall length and weight of the entire unit. In most cases, this results in the requirement of a fewer number of the devices to successfully raise the upper enclosure sections.

The free-standing lifting devices 44, typically, are disposed in opposed pairs on opposite sides of the furnace 10. The lifting devices are suitably connected, as will hereinafter be described, to the outer casement 45, of the upper enclosure section 34. Opposing pairs of lifting devices 44 thus constitute a carrier mechanism 59 for supporting the associated portion of the upper enclosure section 34 independently from the lower enclosure section 33. Three such pairs of lifting devices are illustrated in the embodiment of FIG. 1 for raising and lowering the upper enclosure sections relative to the lower enclosure section. For purposes of description herein, the upper enclosure sections will be considered as being joined together as a unit.

As best shown in FIGS. 2 and 3, each of the lifting devices 44 comprises a screw jack 60 and associated drive means 61 carried atop a tubular column 62 which is a part of the carrier mechanism 59. A tubular mounting member 65 is affixed, as by welding, adjacent the uppermost end of each column 62. Each tubular member 65 includes an elongated pin 66 supported in axially aligned holes 67 provided in opposite sidewalls thereof. The opposite ends 68 of the pin 66 extend outwardly beyond the respective sidewalls of the member 65 into appropriate openings 70 in a pair of spaced angle brackets 71 attached to opposite sides of the casement 45. The openings 70, generally, are elongated in a direction transverse to the furnace to compensate for expansion and contraction caused by changing temperatures in the furnace. The angle brackets 71 include leg portions 72 suitably attached, as by bolts 73 and nuts 74, to the longitudinal member 53 and strengthening plate 75 on the casement 45, as best shown in FIGS. 3 and 4. The plate 75 is suitably affixed as by welding, to the side plate 49 and support member 53 in an appropriate interruption provided in the angle member 50.

Each tubular column 62 is telescopically supported for axial sliding movement on a second tubular column 76 mounted on top of a stanchion 77 resting on the floor 42. The screw jack 60 on the column 62 has an extensible threaded lift rod 78 that is received within an internally threaded collar 79 carried on a plate 80 affixed to the top of the column 76. Thus, it can be appreciated, that by appropriately operating the screw jacks 60 on opposite sides of the furnace 10 to retract or extend the lift rods 78 through the collars 79, the associated tubular columns 62, together with the attached upper enclosure section 34, can be raised and lowered. The telescoping columns 62 and 76 may have cross-sections such as to create cavities 81 between the respective inner and outer walls of the columns on opposite sides thereof, as shown in FIG. 4. To insure the stability and alignment of the column 62 as it is raised and lowered, a pair of guide plates 82 is positioned in the cavity 81 adjacent the lowermost end of the column 62. The guide plates 82 slidably engage opposite sides of the column 76 and are affixed to the inner walls of the column 62 by standoffs 83.

It is to be understood that the form of the invention herein shown and described is to be taken as a preferred embodiment only of the same, and that various changes in the size, shape and arrangement of parts, as well as various procedural changes, may be made without departing from the spirit of the invention or the scope of the following claims.

What is claimed is:

1. A furnace for heating a workpiece comprising, an upper furnace enclosure section and a lower furnace enclosure section together defining an elongated, generally horizontally extending heating chamber, a conveyor disposed between said upper and said lower furnace enclosure sections for transporting a workpiece through the heating chamber, a carrier mechanism for supporting said upper furnace enclosure section independently from said lower enclosure section and the conveyor, said carrier mechanism including a stationary column disposed on one side of the heating chamber, a movable column, means for connecting said movable column to said upper furnace enclosure section, and jack means interconnecting said movable column to said stationary column.

2. A furnace for heating a workpiece as claimed in claim 1, wherein said connecting means comprises a mounting extension affixed to said movable column, a bracket member affixed to said upper furnace enclosure section, and means for joining said bracket member to said mounting extension.

3. A furnace for heating a workpiece as claimed in claim 2, wherein said mounting extension and said bracket member include axially aligned openings and said joining means includes a pin extending through said axially aligned openings.

4. A furnace for heating a workpiece as claimed in claim 3, wherein at least one of said axially aligned openings is elongated in a direction transversely of said furnace to accommodate expansion and contraction of said furnace.

5. A furnace for heating a workpiece as claimed in claim 1, wherein said movable column is generally tubular and is telescopically supported on said stationary column.

6. A furnace for heating a workpiece as claimed in claim 5, wherein said jack means comprises a screw jack carried by said movable column, said screw jack including a lift rod operably connected to the stationary column.

7. A furnace for heating a workpiece as claimed in claim 6, wherein said screw jack includes drive means for selectively operating said screw jack for vertically raising and lowering said movable column and said upper enclosure section relative to said stationary column.

8. A furnace for heating a workpiece as claimed in claim 7, wherein the respective inner and outer walls of said movable and said stationary columns are spaced from one another, and including guide means affixed to one of said walls and slidably engaging the other of the walls.

9. A furnace for heating a workpiece comprising, an upper furnace enclosure section and a lower furnace enclosure section together defining an elongated, generally horizontally extending heating chamber, a conveyor disposed between said upper and said lower furnace enclosure sections for transporting a workpiece through the heating chamber, a carrier mechanism for supporting said upper furnace enclosure section independently from said lower furnace enclosure section and the conveyor means, said carrier mechanism including a pair of opposed stationary columns on opposite sides of the heating chamber, a pair of movable columns associated with respective ones of said pair of opposed stationary columns, means for connecting each one of said pair of movable columns to said upper furnace enclosure section, and jack means interconnecting each one of said pair of movable columns to the respective ones of said pair of opposed stationary columns 10. A furnace for heating a workpiece as claimed in claim 9, wherein said connecting means comprises a mounting extension affixed to each one of said pair of movable columns, a bracket member associated with each said mounting extension affixed to said upper furnace enclosure section, and means for connecting said bracket members to said mounting extensions.

11. A furnace for heating a workpiece as claimed in claim 10, wherein each said mounting extension and associated bracket member includes axially aligned openings, and said connecting means includes a pin extending through said axially aligned openings.

12. A furnace for heating a workpiece as claimed in claim 9, wherein each said movable column is generally tubular and is telescopically supported on the respective one of said opposed stationary columns.

13. A furnace for heating a workpiece as claimed in claim 12, wherein said jack means comprises a screw jack carried by each of said movable columns, each said screw jack including a lift rod operably connected to the respective one of said opposed stationary columns.

14. A furnace for heating a workpiece as claimed in claim 13, wherein each said screw jack includes drive means for selectively operating said screw jacks for vertically raising and lowering said pair of movable columns and said upper enclosure section.

15. A furnace for heating a workpiece as claimed in claim 14, wherein the respective inner and outer walls of each associated pair of said movable and stationary columns are spaced from one another and including guide means affixed to one of said walls and slidably engaging the other of the walls.

* * * * *